United States Patent [19]

Markusch

[11] Patent Number: 4,904,522
[45] Date of Patent: Feb. 27, 1990

[54] PROCESS FOR THE PRODUCTION OF FIBERGLASS MATS

[75] Inventor: Peter H. Markusch, McMurray, Pa.

[73] Assignee: Mobay Corporation, Pittsburgh, Pa.

[21] Appl. No.: 224,847

[22] Filed: Jul. 26, 1988

[51] Int. Cl.$^4$ .............................................. D04H 1/58
[52] U.S. Cl. .................................... 428/288; 428/290; 428/425.6; 524/839; 524/840
[58] Field of Search ............... 418/268, 273, 288, 289, 418/290, 224, 425.6, 426, 423.1, 425.8; 524/834, 840

[56] References Cited

U.S. PATENT DOCUMENTS

| | | | |
|---|---|---|---|
| 3,607,794 | 9/1971 | Abbotson et al. | 260/2.5 |
| 3,959,329 | 5/1976 | Dieterich et al. | 260/453 |
| 3,959,348 | 5/1976 | Reiff et al. | 260/471 |
| 4,052,347 | 10/1977 | Dieterich et al. | 260/2.5 |
| 4,097,422 | 6/1978 | Markusch | 260/2.5 |
| 4,105,594 | 8/1978 | Dieterich et al. | 521/100 |
| 4,129,696 | 12/1978 | Markusch et al. | 521/154 |
| 4,142,030 | 2/1979 | Dieterich et al. | 521/100 |
| 4,144,267 | 3/1979 | Dieterich et al. | 260/505 |
| 4,176,118 | 11/1979 | Petinaux et al. | 260/239 |
| 4,190,459 | 2/1980 | Welte et al. | 106/287 |
| 4,408,008 | 10/1983 | Markusch | 428/423.1 |

*Primary Examiner*—James J. Bell
*Attorney, Agent, or Firm*—Joseph C. Gil; Thomas W. Roy

[57] ABSTRACT

The present invention is directed to a process for the production of fiberglass mats by binding fiberglass with binders based on aqueous polyisocyanate emulsions which do not contain waterglass.

The present invention is also directed to the fiberglass mats produced by this process.

16 Claims, No Drawings

PROCESS FOR THE PRODUCTION OF FIBERGLASS MATS

BACKGROUND OF THE INVENTION

1. Field of the Invention

The present invention is directed to the use or aqueous polyisocyanate dispersions as binders for fiberglass.

2. Description of the Prior Art

It is known to produce fiberglass insulating materials by spraying glass or mineral wool felts with aqueous adhesives based on phenol/formaldehyde resins or urea-formaldehyde resins for the purposes of consolidation. The aqueous adhesives are applied to the glass directly below the spinner in which very hot liquid glass or mineral mass is converted into fibers. Accordingly, adhesives which have high water contents and do not contain volatile organic compounds are used to prevent fires. Low water contents (e.g. <50%) usually do not allow even distribution of the polymer on the fibers. The water is evaporated during subsequent hardening of the adhesives and is removed with the exhaust gases.

Generally, it is not possible to prevent part of the adhesive components from decomposing and further contaminating the exhaust gases. This is an economic disadvantage because part of the adhesive is lost during formation of the bond. Above all, however, this process is attended by significant disadvantages when physiologically harmful, readily volatile components are given off with the exhaust gases, as in the case of formaldehyde-containing adhesives, for example. To avoid air pollution, scrubber systems have to be installed to absorb the volatile organic materials in water. This is not only a costly operation but also means that the resulting aqueous solutions of organic materials must be disposed of.

In response to this problem, it is disclosed in U.S. Pat. No. 4,190,459 to use combinations of waterglass and isocyanates as binders for mineral fiber mats. However, emulsions obtained from mixtures of polyisocyanates and waterglass are highly viscous. Therefore, they are more difficult to pump, spray and disperse into the air as binders for fiberglass when compared to lower viscosity emulsions. Also, in the hardening process, waterglass is converted into silica and soda and the soda can leach out when the mat is exposed to water. Accordingly, it would be desirable to further improve the system disclosed in U.S. Pat. No. 4,190,459.

Water dispersible polyisocyanates and methods for obtaining stable aqueous dispersions of hydrophobic polyisocyanates through chemical modification are known and disclosed in U.S. Pat. Nos. 4,176,118; 4,114,267; 4,142,030; 4,097,422: 4,052,347; 3,959,348: and 3,959,329. It is also disclosed in U.S. Pat. Nos. 4,105,594 and 4,129,696 to provide aqueous solutions or suspensions of hydrophobic polyisocyanates. Furthermore, it is known to use external surfactants or additives which are not reacted with polyisocyanates to achieve dispersibility of hydrophobic polyisocyanates in water as taught by British Patent 1,186,771. Finally, aqueous dispersions of hydrophobic polyisocyanates can also be generated in the absence of any surfactant or additives using mechanical devices which provide high sheer forces. However, the prior art does not suggest the use of these polyisocyanates as binders for fiberglass.

It is an object of the present invention to provide aqueous dispersions of polyisocyanates which are suitable as binders for fiberglass and which do not require the concurrent use of waterglass as disclosed in U.S. Pat. No. 4,190,459, while at the same time maintaining the desirable properties of these fiberglass binders without forming undesirable by-products. This objective may be achieved in accordance with the present invention. Surprisingly, it has been found that emulsions of polyisocyanates are effective binders for the consolidation of fiberglass for the production of fiberglass mats.

SUMMARY OF THE INVENTION

The present invention is directed to a process for the production of fiberglass mats by binding fiberglass with binders based on aqueous polyisocyanate emulsions which do not contain waterglass.

The present invention is also directed to the fiberglass mats produced by this process.

DETAILED DESCRIPTION OF THE INVENTION

The aqueous polyisocyanate dispersions of the present invention can be applied as binders for fiberglass using essentially the same commercial equipment as is presently used for the application of aqueous phenol/formaldehyde binders. However, the polyisocyanate binders cure at a much lower temperature when compared to the phenol/formaldehyde resins which results in considerable energy savings. Further, the polyisocyanate binders do not split off volatile monomers such as the phenol/formaldehyde resins which partially decompose to phenol and formaldehyde. In fact, up to 20% of the phenol/formaldehyde binder is actually lost which necessitates the presence of a scrubber system.

Polyisocyanate binders provide at least the same strength when compared to fiberglass mats prepared with twice the quantity of phenol/formaldehyde resins. Also, fiberglass mats prepared with polyisocyanate binders are not a potential formaldehyde source as are fiberglass mats made with phenol/formaldehyde resins. Finally, fiberglass mats prepared with aqueous polyisocyanates will yield good strength whether or not an aminoalkoxy silane adhesion promotor is added to the aqueous binder formulation. This is not the case for aqueous phenol/formaldehyde resins which require the presence of such amino alkoxy silanes to obtain adequate adhesion and good strength of the resultant fiberglass mats.

In accordance with the present invention it has been found that by mechanically mixing the two components in standard mixing units, it is possible to obtain stable emulsions of polyisocyanates which are eminently suitable for binding fiberglass and producing of fiberglass mats. The aqueous dispersions may be pumped without difficulty and may be dispersed extremely well with air.

It has been found that the emulsions used in accordance with the present invention show very good adhesion, particularly to the surface of fiberglass.

The nature of the polyisocyanates used for preparing the dispersions is not critical, although they should have a high boiling point such that they do not evaporate to any significant extent at 100° C. This prevents significant quantities of the adhesive from volatilizing and being present in the exhaust gases during application or hardening of the adhesive, as is the case with conventional phenol/formaldehyde resins.

Suitable polyisocyanates for use in preparing the aqueous polyisocyanate dispersions include aliphatic, cycloaliphatic, araliphatic, aromatic and heterocyclic polyisocyanates such as those described by W. Siefken in Justus Liebigs Annalen der Chemie, 562, pages 75 to 136. Examples include 1,6-hexamethylene diisocyanate, 1,12-dodecane diisocyanate, cyclobutane-1,3-diisocyanate, cyclohexane-1,3- and/or 1,4-diisocyanate, isocyanato- 3,3,5-trimethyl-5-isocyanatomethyl cyclohexan,2,4-and/or 2,6-hexahydrotoluylene diisocyanate, hexahydro-1,3- and/or 1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenyl methane-2,4'- and/or -4,4'-diisocyanate, napthylene-1,5-diisocyanate, triphenyl methane-4,4',4"-triisocyanate and polyphenyl polymethylene polyisocyanates obtained by phosgenating-aniline formaldehyde condensation products. Also suitable are polyisocyanate adducts containing urea, biuret, urethane, allophanate, uretdione or carbodiimide groups or isocyanurate rings. These adducts may be prepared from any of the monomeric polyisocyanates previously set forth by known methods. It is also possible to use mixtures of any of these monomeric polyisocyanates and/or polyisocyanate adducts.

In general, it is particularly preferred to use the readily available polyisocyanates such as polyphenyl polymethylene polyisocyanates ("crude MDI") and polyisocyanate adducts containing carbodiimide groups, urethane groups, allophanate groups, isocyanurate groups, urea groups or biuret groups especially those based on 2,4- and/or 2,6-toluylene diisocyanate ("TDI").

The polyisocyanates or polyisocyanate adducts used to prepare the aqueous dispersions of the present invention may be used in their unmodified, hydrophobic form or they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 10% by weight, preferably about 0.5 to 10% by weight, more preferably about 1 to 6% by weight and most preferably about 2 to 6% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae H—Z—X—Y—R" or

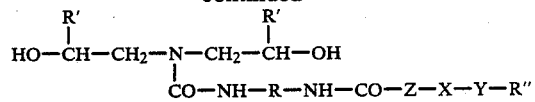

wherein

R represents a difunctional radical obtained by removing the isocyanate groups from a diisocyanate corresponding to those previously set forth, R' represents hydrogen or a monovalent hydrocarbon radical containing from 1 to 8 carbon atoms, preferably a hydrogen atom or a methyl group, R" represents a monovalent hydrocarbon radical having from 1 to 12 carbon atoms, preferably an unsubstituted alkyl radical having from 1 to 4 carbon atoms, X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or —NR'"—wherein R'"has the same definition as R" and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as N-butanol or N-methyl butylamine, using ethylene oxide and optionally another alkylene oxide, for example, propylene oxide. The resultant product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include quaternary ammonium groups and sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Pat. Nos. 1,414,930, 1,432,112 and 1,428,907 as well as German Offenlegungsschrift Pat. No. 2,347,299. Low shear mixers may also be used to disperse the polyisocyanate in water such as the stator-rotor dynamic mixer disclosed in U.S. Pat. No. 4,742,095.

The most preferred polyisocyanate dispersions are those which have a functionality of at least 2. These compounds may be prepared by reacting polyisocyanates having functionalities of greater than 2 with a monofunctional compound containing hydrophilic groups such that the average functionality remains greater than 2. When diisocyanates are used as the polyisocyanate, it is preferred to use difunctional compounds containing hydrophilic groups in order to maintain the functionality in excess of 2. The treatment of diisocyanates with monofunctional compounds containing hydrophilic groups is less preferred since this reduces the functionality to less than 2. Accordingly, the functionality of the component containing hydrophilic groups is dependent upon the functionality of the polyisocyanate in order to provide modified polyisocyanates which have functionalities of at least 2.

The polyisocyanate dispersions generally have a solids content of about 5 to 50, preferably about 20 to 40 weight percent. However, the primary consideration provide viscosities ranging from 5 to 5000, preferably in formulating the solids content of dispersions is to 20 to 1000 mPa.s so that the polyisocyanate dispersions have the proper viscosity for application to fiberglass, preferably by spraying. The polyisocyanate emulsions are applied to fiberglass in an amount sufficient to provide 1 to 20, preferably about 2 to 10 weight percent of polyisocyanate solids, based on the weight of fiberglass.

According to the present invention, it is also possible to incorporate additives into the polyisocyanate emulsions. These additives may be present in the form of a solution or in the form of an emulsion or dispersion.

Suitable additives include known catalysts, e.g., tertiary amines such as triethyl amine, tributyl amine, N-methyl morpholine, N-ethyl morpholine, N-cocomorpholine, N,N,N',N'-tetramethyl ethylene diamine, 1,4-diazabicyclo-(2,2,2)-octane, N-methylN'-dimethyl aminoethyl piperazine, N,N-dimethyl benzylamine, bis-(N,N-diethyl aminoethyl)-adipate, N,N-diethyl benzyl amine, pentamethyl diethylene triamine, N,N-dimethyl cyclohexyl amine, N,N,N',N'-tetramethyl-1,3-butane diamine, N,N-dimethyl-β-phenyl ethyl amine, 1,2-dimethyl imidazole and 2-methyl imidazole. Other suitable catalysts include Mannich bases of secondary amines such as dimethyl amine, aldehydes such as formaldehyde, ketones such as acetone, methyl ethyl ketone or cyclohexanone and phenols such as phenol, nonyl phenol or bis-phenol.

Examples of tertiary amines containing isocyanate-reactive hydrogen atoms which may be used as catalysts are triethanolamine, triisopropanolamine, Z5 N-methyl diethanolamine, N-ethyl diethanolamine, N,N-dimethyl ethanolamine and the reaction products of those tertiary amines with alkylene oxides such as propylene oxide and/or ethylene oxide.

Other suitable catalysts include silaamines having carbon-silicon bonds of the type described in German Patent No. 1,229,290 (U.S. Pat. No. 3,620,984), for example 2,2,4-trimethyl-2-silamorpholine and 1,3-diethyl aminomethyl tetramethyl disiloxane.

Also suitable are nitrogen-containing bases such as tetraalkyl ammonium hydroxides, alkali metal hydroxides such as sodium hydroxide, alkali metal phenolates such as sodium phenolate or alkali metal alcoholates, such as sodium methylate. Hexahydrotriazines may also be used as catalysts.

According to the present invention, organometallic compounds, especially organotin compounds, may also be used as catalysts. These catalysts are preferred since they promote the reaction between isocyanate groups and water.

Preferred organotin compounds include tin(II)salts or carboxylic acids such as tin(II)acetate, tin(II)octoate, tin(II)ethyl hexoate and tin(II)laurate, and the tin(IV)-compounds such as dibutyl tin oxide, dibutyl tin dichloride, dibutyl tin diacetate, dibutyl tin dilaurate, dibutyl tin maleate or dioctyl tin diacetate. It is, of course, possible to use the above-mentioned catalysts in the form of mixtures.

Further representatives of catalysts suitable for use in accordance with the present invention and details on the way in which the catalysts function may be found in Kunststoff-Handbuch, Vol. VII, by Vieweg and Hochtlen, Carl-Hanser-Verlag, Munich, 1966, for example on pages 96 to 102.

The catalysts are generally used in quantities of about 0.001 to 5% by weight, based on the aqueous polyisocyanate dispersions.

According to the present invention, surface-active additives may also be used. Examples of emulsifiers are the sodium salts of castor oil sulphonates or salts of fatty acids with amines such as diethyl amine/oleic acid or diethanolamine/stearic acid. Alkali metal or ammonium salts of sulphonic acids such as those of dodecyl benzene sulphonic acid or dinaphthyl-methane disulphonic acid, fatty acids such as ricinoleic acid or polymeric fatty acids may also be used as surface-active additives. Useful additives are also polyoxyethylene containing compounds which are water soluble or water dispersible.

According to the present invention, it is also possible to use reaction retarders, for example acids such as hydrochloric acid or organic acid halides. Additional additives include adhesion promotors, such as silanes.

Other examples of the additives optionally used in accordance with the present invention and also details on the way in which these additives are to be used and how they function, may be found in Kunststoff-Handbuch, Vol. VII, published by Vieweg and Hochtlen, Carl-Hanser-Verlag, Munich, 1966, for example on pages 103 to 113.

The invention is further illustrated but is not intended to be limited by the following examples in which all parts and percentages are by weight unless otherwise specified.

EXAMPLES

Starting Materials

Polyisocyanate P-1:

A polyphenyl polymethylene polyisocyanate with an NCO-content of 31.0% and a viscosity at 25° C. of approximately 200 mPa.s.

Polyisocyanate P-2:

The reaction product of 4,4'-diphenylmethane diisocyanate and tripropylene glycol with an NCO-content of 22.6% and a viscosity at 25° C. of 725 mPa.s.

Polyether PE-1:

A polyether monoalcohol of n-butanol, ethylene oxide and propylene oxide (molar ratio of ethylene oxide to propylene oxide 83:17) having an OH-number of 26.

Polyisocyanate P-3:

80 parts by weight of polyisocyanate P-2 were combined with 24 parts by weight of polyether PE-1 and reacted under a nitrogen blanket with agitation for 2 hrs. at 80°–90° C. The resulting hydrophilic polyisocyanate prepolymer (P-3) had an NCO content of 16.9% and a viscosity of 740 mPa.s at 25° C.

Polyisocyanate P-4:

80 parts by weight of polyisocyanate P-1 were combined with 24 parts of polyether PE-1 and reacted under a nitrogen blanket with agitation for 2 hrs. at 80°–90° C. The resulting hydrophilic polyisocyanate prepolymer (P-4) had an NCO content of 23.3% and a viscosity of 490 mPa.s at 25° C.

Silane S-1:

$(CH_3O)_3Si(CH_2)_3NHCH_2NH_2$

Preparation of the Aqueous Polyisocyanate Dispersions

Batches of approximately 40 lbs. of aqueous polyisocyanate were prepared using a 5-gallon container and a mechanical stirrer. Water was weighed in first, followed by the additives (Silane S-1 or polyether PE-1) and finally the polyisocyanates were charged under good agitation. Compositions and solid contents of the different aqueous polyisocyanate dispersions are outlined in Table I.

TABLE I

| 40 lb. batches of Aqueous Polyisocyanate Dispersions (Binder) | | | | | | | | | |
|---|---|---|---|---|---|---|---|---|---|
| | A | B | C | D | E | F | G | H | K |
| Polyisocyanate P-3 (lbs) | 12 | 8.5 | 18 | 12 | 12 | — | — | — | — |
| Polyisocyanate P-4 (lbs) | — | — | — | — | — | 12 | 6 | 6 | 9 |
| Polyisocyanate P-1 (lbs) | — | — | — | — | — | — | 6 | 6 | 9 |
| Polyether PE-1 (g) | — | — | — | 272 | — | — | — | — | — |
| Silane S-1 (g) | 11 | 8 | 16 | 11 | — | 11 | 11 | — | 16 |
| Water (lbs) | 28 | 31.5 | 22 | 28 | 28 | 28 | 28 | 28 | 22 |
| % solids of aqueous dispersion | 30 | 21 | 43 | 30 | 30 | 30 | 30 | 30 | 43 |

All dispersions had a milky white appearance, very low viscosity and remained processible for more than thirty minutes. Thereafter, some of the aqueous dispersions started foaming, specifically those prepared from highly hydrophilic polyisocyanates like Example F in Table I.

The dispersions according to Table I were delivered to six spraying nozzles where they were atomized into fine particles by means of compressed air. The nozzles were arranged in a circle spraying the dispersions towards the center of the fiberglass from a distance of about 5". The fiberglass was manufactured using a standard mineral fiber spinning machine approximately 40" above the center of the ring with the nozzles. Glass was produced at a rate of about 1000 lbs/hr.

The fiberglass was collected on a conveyor belt, representative samples for each of the different binder types described in Table I were taken, cut into 15"×15" squares, adjusted to 4" heights, cured under different temperature conditions, and finally the weight, strength, and binder content were determined.

Results are listed in Table II.

TABLE II

| Fiberglass With Polyurethane/Urea Binder (15 × 15 × 4" sample) | | | |
|---|---|---|---|
| Sample | Cure (Min/°F.) | Dry Weight (lbs) | Tensile Strength (psi) | Binder Content (%) |
| A-1 | 12/400 | .1442 | 33.0 | 4.1 |
| A-2 | 20/350 | .1045 | 17.2 | 4.0 |
| A-3 | 24 hrs/75 | .1122 | 21.0 | 2.9 |
| B-1 | 10/250 | .1762 | 36.5 | 3.4 |
| B-2 | 20/250 | .1326 | 29.0 | 3.8 |
| B-3 | 24 hrs/75 | .1383 | 32.5 | 3.9 |
| C-1 | 10/250 | .1312 | 32.0 | 3.0 |
| C-2 | 20/250 | .1279 | 32.5 | 3.6 |
| C-3 | 24 hrs/75 | .1075 | 20.5 | 2.9 |
| D-1 | 10/250 | .1227 | 33.0 | 3.6 |
| D-2 | 20/250 | .1278 | 39.0 | 4.0 |
| D-3 | 24 hrs/75 | .1502 | 40.0 | 4.2 |
| E-1 | 10/250 | .1263 | 25.5 | 3.8 |
| E-2 | 20/250 | .1324 | 35.0 | 3.6 |
| E-3 | 24 hrs/75 | .1475 | 41.5 | 3.8 |
| F-1 | 10/250 | .1152 | 10.0 | 3.5 |
| F-2 | 20/250 | .1426 | 14.5 | 4.4 |
| F-3 | 24 hrs/75 | .1750 | 22.5 | 4.2 |
| G-1 | 10/250 | .1482 | 29.0 | 4.0 |
| G-2 | 20/250 | .907 | 12.0 | 4.4 |
| G-3 | 24 hrs/75 | .1497 | 26.0 | 2.9 |
| H-1 | 10/250 | .1277 | 44.0 | 2.9 |
| H-2 | 20/250 | .1046 | 26.0 | 4.0 |
| H-3 | 24 hrs/75 | .1161 | 33.0 | 3.5 |
| K-1 | 10/250 | .1258 | 33.0 | 4.9 |
| K-2 | 20/250 | .1044 | 26.0 | 5.4 |
| K-3 | 24 hrs/75 | .1197 | 24.0 | 6.0 |

In comparison, a standard phenol/formaldehyde binder used in an amount of 6–8% and cured at 450° F./20 min. yielded a tensile strength of about 25 psi at 0.105 lbs dry weight, 30 psi at 0.130 lbs dry weight and 35 psi at 0.157 lbs dry weight. The results in Table II clearly indicate that strength values as high or higher than the standard can be obtained when approximately half the amount of an aqueous polyisocyanate is used as the binder and the temperature necessary to cure the binder can be substantially lower.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a fiberglass mat which comprises treating fiberglass with a binder based on an aqueous polyisocyanate emulsion in the absence of waterglass.

2. The process of claim 1 wherein said polyisocyanate dispersion is used in an amount of 1 to 20 wt. % of polyisocyanate solids, based on the weight of fiberglass.

3. The process of claim 1 wherein said polyisocyanate is rendered hydrophilic by reaction with a compound containing an ionic or potential ionic group.

4. The process of claim 2 wherein said polyisocyanate is rendered hydrophilic by reaction with a compound containing an ionic or potential ionic group.

5. The process of claim 1 wherein said polyisocyanate dispersion is rendered hydrophilic by reaction with a compound containing a lateral or terminal nonionic hydrophilic group.

6. The process of claim 2 wherein said polyisocyanate dispersion is rendered hydrophilic by reaction with a compound containing a lateral or terminal nonionic hydrophilic group.

7. A process for the production of fiberglass mats which comprises treating fiberglass with a binder which is based on an aromatic polyisocyanate and which does not contain waterglass in an amount of 1 to 20 wt. % of polyisocyanate solids, based on the weight of fiberglass.

8. The process of claim 7 wherein said polyisocyanate dispersion is rendered hydrophilic by treatment with a compound containing a lateral or terminal nonionic hydrophilic group.

9. A fiberglass mat which is prepared by a process which comprises treating fiberglass with a binder based on an aqueous polyisocyanate emulsion in the absence of waterglass.

10. The fiberglass mat of claim 9 wherein said polyisocyanate dispersion is used in an amount of 1 to 20 wt. % of polyisocyanate solids, based on the weight of fiberglass.

11. The fiberglass mat of claim 9 wherein said polyisocyanate is rendered hydrophilic by reaction with a compound containing an ionic or potential ionic group.

12. The fiberglass mat of claim 10 wherein said polyisocyanate is rendered hydrophilic by reaction with a compound containing an ionic or potential ionic group.

13. The fiberglass mat of claim 9 wherein said polyisocyanate dispersion is rendered hydrophilic by reaction with a compound containing a lateral or terminal nonionic hydrophilic group.

14. The fiberglass mat of claim 10 wherein said polyisocyanate dispersion is rendered hydrophilic by reaction with a compound containing a lateral or terminal nonionic hydrophilic group.

15. A fiberglass mat which is prepared by a process which comprises treating fiberglass with a binder which is based on an aromatic polyisocyanate and which does not contain waterglass in an amount of 1 to 20 wt. % of polyisocyanate solids, based on the weight of fiberglass.

16. The fiberglass mat of claim 15 wherein said polyisocyanate dispersion is rendered hydrophilic by treatment with a compound containing a lateral or terminal nonionic hydrophilic group.

* * * * *